Oct. 1, 1968 R. THIRION 3,403,944
BRAKING PRESSURE MODIFYING DEVICE
Filed July 20, 1967 2 Sheets-Sheet 1

INVENTOR
RENE THIRION
BY
Richard G. Geib
ATTORNEY he# United States Patent Office 3,403,944
Patented Oct. 1, 1968

3,403,944
BRAKING PRESSURE MODIFYING DEVICE
René Thirion, Paris, France, assignor to
Societe Anonyme D.B.A.
Filed July 20, 1967, Ser. No. 654,900
Claims priority, application France, July 30, 1966,
71,570
6 Claims. (Cl. 303—6)

ABSTRACT OF THE DISCLOSURE

A braking pressure modifying device for location in a braking system between the braking pressure control source such as a master cylinder and a set of receiver cylinders such as the wheel cylinders of a set of brakes which comprises resilient members both as pressure control means and valve means.

Summary

More particularly, the braking pressure modifying device according to the invention is of the type comprising a casing having normally open valve means adapted to control the communication between an inlet chamber connected to a hydraulic control pressure source and an outlet chamber connected to a set of receiver cylinders. The valve means includes a movable valve seat member responsive to the differential pressure across said valve means which seat member is resiliently maintained in its rest position. It further includes a movable valve control member connected to a control element which is responsive to the outlet pressure. The control element is resiliently maintained in its rest position so that the valve control member is maintained out of engagement with said valve seat member, said control element being adapted to urge said valve control member in sealing engagement with said valve seat member when the outlet pressure is above a predetermined value.

The main object of the invention is to provide a pressure modifying device of the above type wherein said valve seat member is comprised of a resiliently deformable metallic washer the periphery of which is sealingly secured to said casing. The central portion of the washer, which is relatively movable with respect to said casing, is provided with an opening, the outer edge of which defines said valve seat member.

It is clearly understood that such a feature permits obtaining a device which is cheap to manufacture and easy to assemble and which provides a reliable and reproducible operation. The provision of this resilient washer defining a simple static fluid tightness permits avoiding the drawbacks of the already known devices of the dynamic fluid tightness type requesting the machining of pistons and bores, annular seals. With such a washer, the problems of fluid tightness are easily solved. The friction forces occurring with the known devices upon displacement of said valve seat member are nullified so that the hysteresis resulting from these friction forces is practically negligible. Furthermore, the resilient washer permits also to substantially reduce the size of the device. Finally the provision of a metallic washer permits obtaining a device having exactly the same operation regardless of the hydraulic fluid used, the temperature of the fluid during the braking operations, and the duration of time the device is used during the life of the vehicle. In effect, the metallic material is not affected by the hydraulic fluids generally used in the braking systems whatever may be the pressure and the temperature of these fluids, and its modulus of elasticity is not substantially affected by the range of the high temperatures transferred by the hydraulic fluid upon braking.

It should also be noted that the mere substitution of a given metallic washer for another one having different size, such as or different thickness permits obtaining a device having different characteristics of operation.

Another object of the invention is to provide a braking pressure modifying device of the above type wherein said control element is comprised of a resiliently deformable metallic cup the periphery of which is sealingly secured to said casing, the central portion of said cup being connected to said valve control member by a stem extending through said valve seat member, the provision of said resilient metallic cup permitting obtaining the same advantages as those listed hereinabove.

Still another object of the invention is to provide a braking pressure modifying device of the above type wherein said control element is further responsive to a variable control force varying as a function of a variable condition of operation, such as the load of the corresponding vehicle axle.

Drawing description

Other objects and advantages of the invention will appear more clearly in the following description with reference to the accompanying drawings in which.

Detailed description

Figure 1:
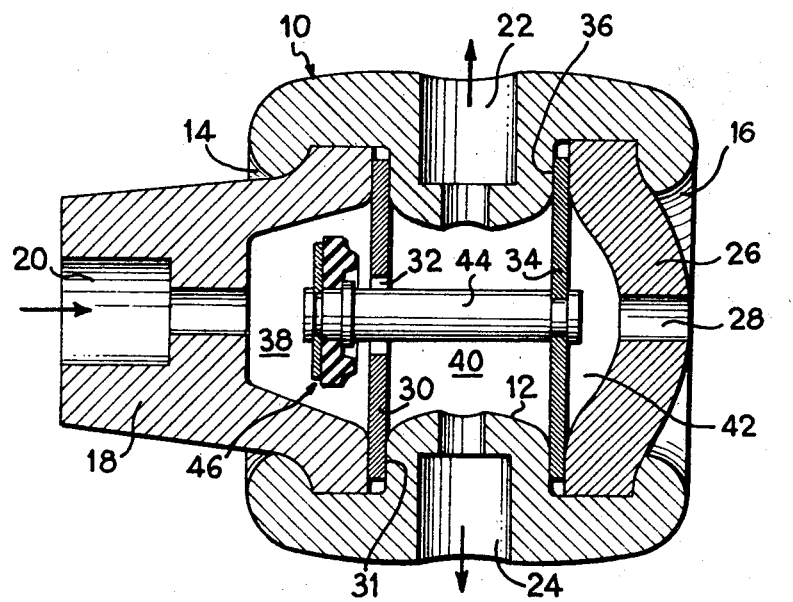
FIGURE 1 is a cross sectional view of a first embodiment of a pressure modifying device according to the invention.

Referring to FIGURE 1, the reference numeral 10 designates a pressure modifying device the casing of which is of a substantially cylindrical shape to define a bore 12 opening, as at 14 and 16, at both ends of the casing 10. A plug 18 having an inlet port 20 is sealingly secured to casing 10, by a crimping operation for instance, to close the end 14 of the bore 12. The inlet port 20 is suitably connected to the outlet of a hydraulic braking pressure control source such as a master cylinder (not shown). The casing 10 is provided with two outlet ports 22 and 24 which are suitably connected to a set of receiver cylinders (not shown) such as the wheel cylinders of a set of brakes corresponding to a given axle of a vehicle (not shown).

The end 16 of the bore 12 is closed by a plug 26 again by a crimping operation to sealingly secure the plug 26 to casing 10, and plug 26 is provided with a control port 28 for purposes as will hereinafter appear.

A resilient metallic washer 30, having a central opening 32 therein, is sealingly secured in the bore 12, the peripheral edge of washer 30 being sealingly located between the plug 18 and an annular shoulder 31 provided in bore 12. Similarly, a resilient metallic cup or disc 34 is sealingly secured at its periphery to the bore 12, between the plug 26 and an annular shoulder 36 provided in the bore 12. A thin layer of plastic material suitably coating the metallic washer 30 and disc 34 warrants the fluid tightness of these latter elements in the bore 12. Within the bore 12 as closed by plugs 18 and 26, the washer 30 and disc 34 define an inlet chamber 38 connected to inlet port 20, an outlet chamber 40 connected to outlet ports 22 and 24 and a control chamber 42 connected to control port 28.

The disc (as well as the washer) is made of metallic material such as spring leaf steel which may be flat or waved so that under a predetermined differential pressure across the disc, the central portion thereof is moved with respect to the periphery of the disc a distance which depending on the size of the disc and modulus of elasticity of the spring leaf steel constituting said disc. The resiliency of the washer is chosen to be less than that of the disc, as will be explained hereinafter.

A stem 44 is suitably secured to the central portion of the disc 34 and extends through the central opening 32 of washer 30. A valve control member 46 is suitably secured to the free end of stem 44 and is adapted (when actuated by disc 34 via stem 44) to sealingly engage the outer edge of opening 32. The length of stem 44 is such that, in the normal or rest positions of washer 30 and disc 34, the valve defined by control member 46 and central opening 32 is normally open, allowing the free communication between inlet and outlet chambers 38 and 40 respectively.

Figure 2:
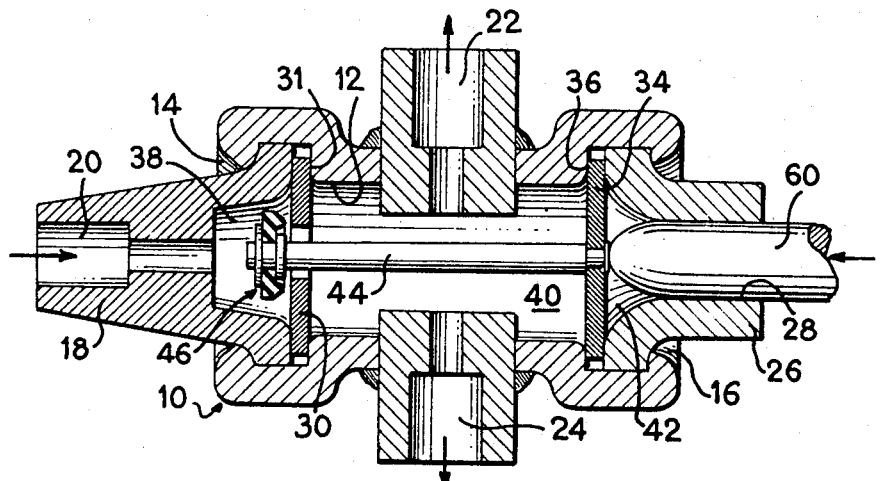
FIGURE 2 is a cross sectional view of a second embodiment of the invention.

The device shown in FIGURE 2 is substantially the same as the one shown in FIGURE 1. The only difference consists of the provision of a push rod slidably mounted in the opening 28 of plug 26 to engage the face of the disc 34 exposed to the pressure in the control chamber 42. The push rod 60 is suitably connected by resilient linkage connection (not shown) to the axle of the vehicle corresponding to the set of brakes controlled by the device.

Figure 3:
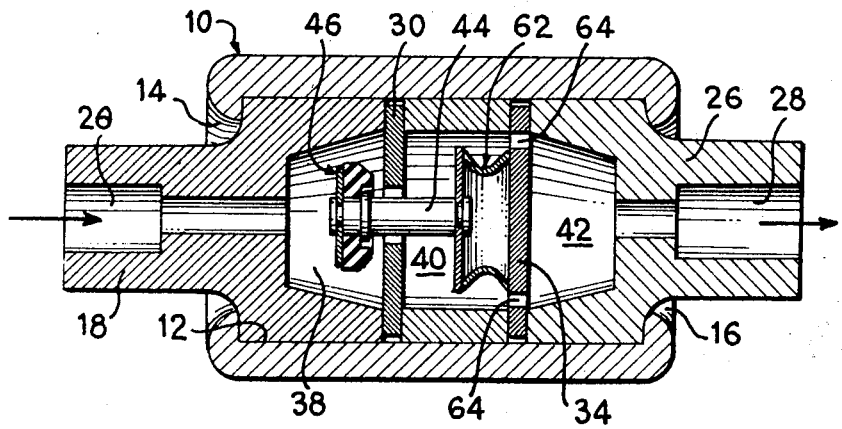
FIGURE 3 is a cross sectional view of a third embodiment of the invention.

The device shown in FIGURE 3 has the same principle and operation as the two preceding embodiments. In this third embodiment, the valve stem 44 is connected to the disc 34 through a barometric bellows or capsule 62 responsive to the outlet pressure in chamber 40 and located between the disc 34 and the stem 44 to actuate this latter according to the outlet pressure; the disc 34 is provided with openings 64 connecting the chambers 40 and 42 together. The disc 34 is considered as rigid, and the outlet ports 22 and 24 are substituted for the single port 28 which is now connected to the receiver cylinders.

*Operation*

The operation of the device described hereinabove is as follows: Upon braking, hydraulic fluid under pressure flows from the control source to the receiver cylinders through the inlet port 20, the inlet chamber 38, normally open valve 46–32, outlet chamber 40, and thence through the outlet ports 22 and 24. When the hydraulic pressure in the outlet chamber 40, which acts on the disc 34 against the pressure in control chamber 42, reaches a predetermined value the central portion of the disc moves a sufficient distance toward the right (as viewed in FIGURE 1) to cause the closure of the valve 46 connected thereto. Upon further increase of the hydraulic pressure, the washer 30 is subjected to the differential pressure across the valve 46. The central portion of the washer 30 which defines the valve seat member of the valve 46 moves slightly to the right (as viewed in FIGURE 1) when the pressure differential overcomes the washer to open the valve 46–30. Consequently, the outlet pressure in chamber 40 increases this resulting on the one hand in a decrease of the differential pressure acting on the washer 30 and on the other hand in an increase of the outlet pressure acting on disc 34. It results therefrom that the valve 46–30 is urged toward its closed position when the outlet pressure in chamber 40 reaches a value which is determined as a function of the inlet pressure in chamber 38. Thus, when the inlet pressure from the source increases above the predetermined value defined hereinabove, the outlet pressure to the receiver cylinders increases at a lower rate accordingly, the relationship or the ratio between the inlet and the outlet pressures being determined by the sizes and the resiliencies of the washer and of the disc.

Upon releasing the brakes the operation is substantially the reverse of the one described hereinabove upon braking operation. The hysteresis of the device may be considerably reduced and even totally suppressed by a suitable choice of the elasticity response characteristics of the washer 30 and of the disc 34.

If desired, the control port 28 and the chamber 42 may be connected to a source of variable control pressure representative of a variable condition of braking operation such as the load of the corresponding vehicle axle. With such a disposition, the above predetermined value as well as the relationship between inlet and outlet pressures may be varied as a function of this variable condition of braking operation.

I claim:

1. A braking pressure modifying device for location between a hydraulic control pressure source and a set of receiver cylinders said device comprising a casing having an inlet chamber connected to said pressure source, an outlet chamber connected to said cylinder and normally open valve means adapted to control the communication between said inlet and outlet chambers, said valve means including a movable valve control member, a movable valve seat member responsive to the differential pressure across said valve means, said valve seat member being resiliently maintained in its rest position and a movable control element operatively connected to said valve control member to actuate same, said movable control element being responsive to the pressure in said outlet chamber and being operative to bias said valve control member in sealing engagement with said valve seat member when the outlet pressure is above a predetermined value, the pressure modifying device being characterized in that said valve seat member is comprised of a resiliently deformable metallic washer the periphery of which is sealingly secured to said casing, the central portion of said washer, which is relatively movable wtih respect to said casing, being provided with an opening the outer edge of which is adapted to be sealingly engaged by said valve control member.

2. A braking pressure modifying device according to claim 1 characterized in that said control element is comprised of a resiliently deformable metallic disc the periphery of which is sealingly secured to said casing, the central portion of said disc being connected to said valve control member by a stem extending through said valve seat member.

3. A braking pressure modifying device according to claim 1, characterized in that said control element is further responsive to a variable control force varying as a function of a variable condition of operation.

4. A braking pressure modifying device according to claim 2, characterized in that said control element is further responsive to a variable control force varying as a function of a variable condition of operation.

5. A braking pressure modifying device according to claim 1 characterized in that a thin layer of plastic material is applied on said washer to provide the fluid tightness between the washer and said casing when joined together.

6. A braking pressure modifying device for location between a hydraulic control pressure source and a set of receiver cylinders said device comprising a casing having an inlet chamber connected to said pressure source, an outlet chamber connected to said cylinder and normally open valve means adapted to control the communication between said inlet and outlet chambers, said valve means including a movable valve control member, a movable valve seat member responsive to the differential pressure across said valve means, said valve seat member being resiliently maintained in its rest position and a movable control element operatively connected to said valve control member to actuate same, said movable control element being responsive to the pressure in said outlet chamber and being operative to bias said valve control member in sealing engagement with said valve seat member when the outlet pressure is above a predetermined value, the pressure modifying device being characterized in that said valve seat member is comprised of a resilient washer the periphery of which is sealingly secured to said casing between said inlet chamber and said outlet chamber, said washer being provided with an opening with a valve seat thereabout operatively arranged to be sealingly engaged by said valve control member.

References Cited

UNITED STATES PATENTS

| | | | |
|---|---|---|---|
| 2,241,191 | 5/1941 | Freeman | 303—6 XR |
| 3,251,186 | 5/1966 | De Coye De Castelet | 303—6 XR |

MILTON BUCHLER, *Primary Examiner.*

J. J. McLAUGHLIN, *Assistant Examiner.*